(12) United States Patent
Lin et al.

(10) Patent No.: US 10,956,493 B2
(45) Date of Patent: Mar. 23, 2021

(54) DATABASE COMPARISON OPERATION TO IDENTIFY AN OBJECT

(71) Applicant: ENTIT Software LLC, Sunnyvale, CA (US)

(72) Inventors: Qian Lin, Sunnyvale, CA (US); Meichun Hsu, Sunnyvale, CA (US); Qiming Chen, Sunnyvale, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 234 days.

(21) Appl. No.: 15/570,878

(22) PCT Filed: May 19, 2015

(86) PCT No.: PCT/US2015/031463
§ 371 (c)(1),
(2) Date: Oct. 31, 2017

(87) PCT Pub. No.: WO2016/186649
PCT Pub. Date: Nov. 24, 2016

(65) Prior Publication Data
US 2018/0293311 A1    Oct. 11, 2018

(51) Int. Cl.
    *G06F 16/583*    (2019.01)
    *G06F 16/783*    (2019.01)
    *G06F 16/71*     (2019.01)
    *G06F 16/738*    (2019.01)
    *G06F 16/78*     (2019.01)

(52) U.S. Cl.
    CPC ........ *G06F 16/784* (2019.01); *G06F 16/5854* (2019.01); *G06F 16/71* (2019.01); *G06F 16/738* (2019.01); *G06F 16/7867* (2019.01); *G06F 16/783* (2019.01)

(58) Field of Classification Search
    CPC ............... G06F 16/583; G06F 16/9535; G06F 16/5854; G06F 16/783
    See application file for complete search history.

(56) References Cited

U.S. PATENT DOCUMENTS

| 6,301,370 | B1  | 10/2001 | Steffens |              |
|-----------|-----|---------|----------|--------------|
| 2003/0177503 | A1* | 9/2003 | Sull     | G06T 3/4092  |
|           |     |         |          | 725/112      |
| 2004/0213437 | A1* | 10/2004 | Howard  | G06F 16/93   |
|           |     |         |          | 382/115      |

(Continued)

OTHER PUBLICATIONS

Li, et al., "FastNMF: highly efficient monotonic fixed-point non-negative matrix factorization algorithm with good applicability", 2009, SPIE. (Year: 2009).*

(Continued)

*Primary Examiner* — Sheryl L Holland

(57) ABSTRACT

Examples disclosed herein relate to a database comparison operation to identify an object. For example, a processor may enroll a set of object templates in a storage based on objects within input content and enroll a target object template in the storage based on a target object in target content. The processor may identify an object within the input content associated with the target object based on a database comparison operation of the stored set of object templates to the stored target object template. The processor may output object recognition information related to the identified object.

18 Claims, 5 Drawing Sheets

(56) References Cited

U.S. PATENT DOCUMENTS

| | | | |
|---|---|---|---|
| 2005/0207622 A1* | 9/2005 | Haupt | G06K 9/00288 |
| | | | 382/118 |
| 2007/0277036 A1* | 11/2007 | Chamberlain | G06F 16/2455 |
| | | | 713/171 |
| 2008/0021906 A1* | 1/2008 | Lunenfeld | G06F 16/951 |
| 2008/0279425 A1 | 11/2008 | Tang | |
| 2009/0110248 A1 | 4/2009 | Masuda et al. | |
| 2009/0310822 A1 | 12/2009 | Chang et al. | |
| 2011/0170749 A1 | 7/2011 | Schneiderman et al. | |
| 2012/0155718 A1 | 6/2012 | Hwang et al. | |
| 2014/0133712 A1 | 5/2014 | Boncyk et al. | |
| 2015/0016670 A1* | 1/2015 | Zhou | G06K 9/00973 |
| | | | 382/103 |

OTHER PUBLICATIONS

Friedman et al., "SQL/MapReduce: A practical approach to self-describing, polymorphic, and parallelizable user-defined functions", 2009, ACM. (Year: 2009).*

Aruna Sri Bommagani et al, "A Framework for Secure Cloud-Empowered Mobile Biometrics", Sep. 14, 2014.

International Search Report and Written Opinion dated Feb. 19, 2016 for PCT Application No. PCT/US2015/031463 Filed May 19, 2015, 14 pages.

* cited by examiner

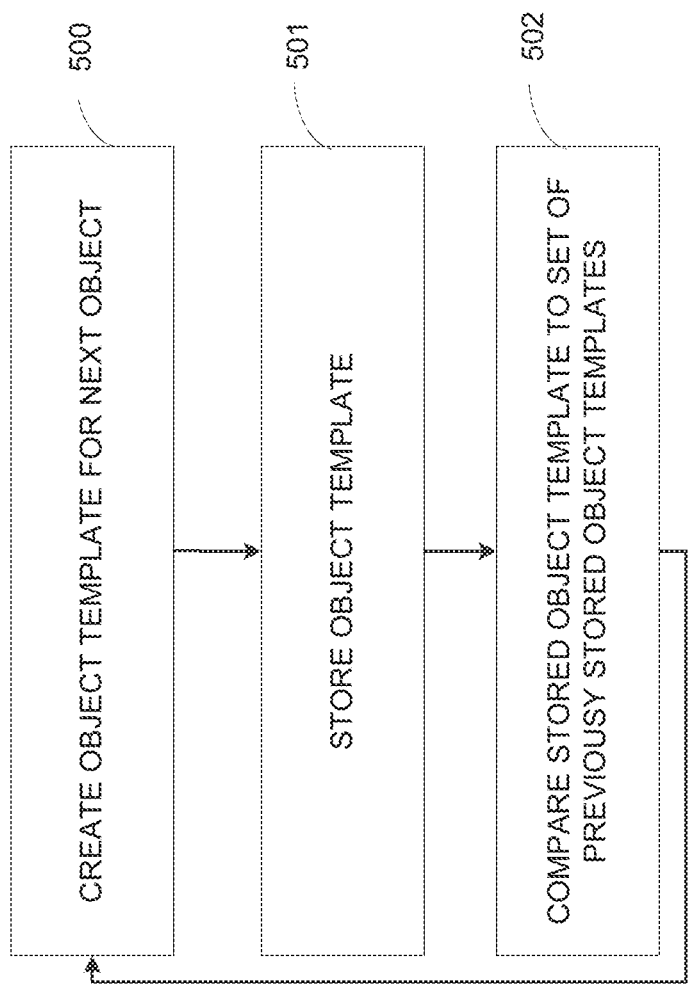

DATABASE COMPARISON OPERATION TO IDENTIFY AN OBJECT

BACKGROUND

Object recognition may be performed on video and image content. For example, a surveillance video may be analyzed to determine the identification of a person appearing in the video. Image analysis techniques may be used to create a template indicating features associated with the person, such as facial features.

BRIEF DESCRIPTION OF THE DRAWINGS

The drawings describe example embodiments. The following detailed description references the drawings, wherein:

FIG. 5 is a flow chart illustrating one example of performing a database comparison operation to identify an object in conjunction with storing object information.

DETAILED DESCRIPTION

In one implementation, object identification is performed by a database comparison operation. For example, a user defined database function may include executable instructions to perform object identification related to stored image and/or video data. The database comparison function may be executed by a processor associated with a database, such as a database engine and/or database analytics processor associated with the database engine. The processor may execute user defined functions to store object template information and then compare the stored object template information using database comparison capabilities. For example, a processor may execute a database operation to perform person recognition based on a database comparison of a first set of stored object templates to a stored target object template. The processor may output information related to the person recognition, such as a set of images displaying the top N closest results.

Performing object recognition analytics as a database operation allows for the data to be queried without first loading the data from the database to be analyzed by a software application. For example, the method may be faster due to the use of database comparison functionality. Both images and videos may be treated the same, such as where the same face template is associated with a video frame and an image because the database may store the relevant information such that the video itself is not reloaded at the time of comparison. Additionally, a database comparison operation may take advantage of parallel processing performed by the database, such as where the database automatically performs comparison functions related to different portions of stored data in parallel.

Figure 1:
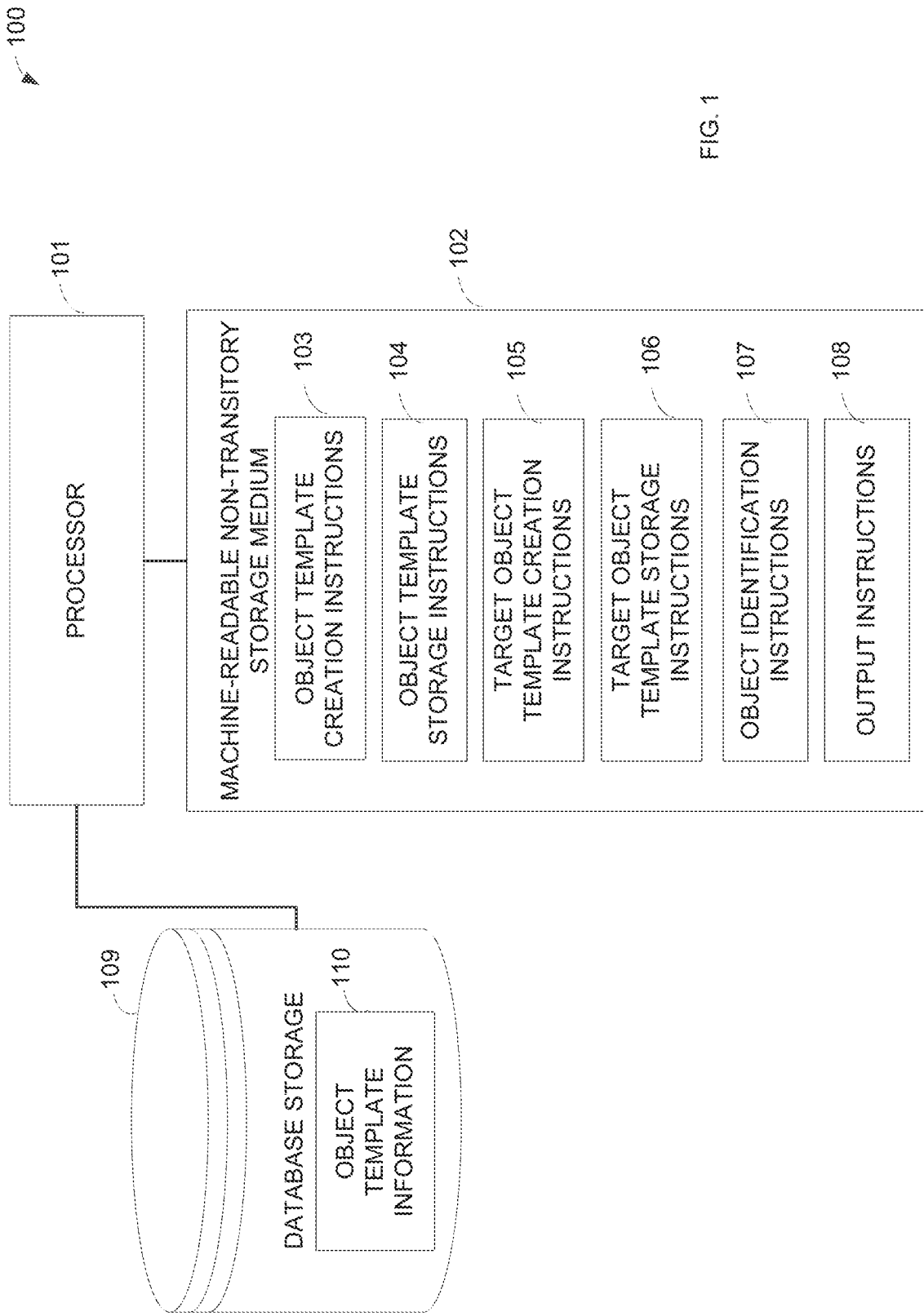
FIG. 1 is a block diagram illustrating one example of a database system to perform a database comparison operation to identify an object.

FIG. 1 is a block diagram illustrating one example of a database system to perform a database comparison operation to identify an object. The database system 100 may perform object recognition by comparing object templates stored in a database to a stored target object template. For example, the object templates may include templates related to face recognition. The database system 100 includes a storage 109, a processor 101, and a machine-readable storage medium 102.

The processor 101 may be a database engine or an analytics engine associated with a database engine. The processor 101 may be a central processing unit (CPU), a semiconductor-based microprocessor, or any other device suitable for retrieval and execution of instructions. As an alternative or in addition to fetching, decoding, and executing instructions, the processor 101 may include one or more integrated circuits (ICs) or other electronic circuits that comprise a plurality of electronic components for performing the functionality described below. The functionality described below may be performed by multiple processors.

The database 109 may be any suitable data storage system for storing data, such as a relational database. The database 109 includes object template information 110. The object template information 110 may be, for example, templates for person identification, such as face templates. The object template information may include information associated with the source of the object template and the location of the object template within the input content. For example, the object template information 110 may include a file name, tracker number, video frame number, object bounding box coordinates, face bounding box coordinates, and object feature template. The object template information 110 may include information related to features associated with an object determined to be of a particular type, such as a person or face. The object template information 110 may include feature information related to a bounding box in an image or video where the bounding box surrounds an object of the particular type. The object template information 110 may include object template information of multiple types of objects. For example, a database system for person identification may store face object templates and clothing object templates.

The processor 101 may communicate with the machine-readable storage medium 102. The machine-readable storage medium 102 may be any suitable machine readable medium, such as an electronic, magnetic, optical, or other physical storage device that stores executable instructions or other data (e.g., a hard disk drive, random access memory, flash memory, etc.). The machine-readable storage medium 102 may be, for example, a computer readable non-transitory medium. The machine-readable storage medium 102 may include instructions, such as user defined database functions, that may be executed by the processor 101. For example, the machine-readable storage medium 102 may include object template creation instructions 103, object template storage instructions 104, target object template creation instructions 105, target object template storage instructions 106, object identification instructions 107, and output instructions 108.

In one implementation, a second processor communicates with the processor 101 via a network. For example, the second processor may query the processor 101 via a network related to the target object, and the second processor may output information related to received information from the processor 101 related to the object recognition information. For example, a software application may perform an operation to call a database function such that the processor 101 associated with a database system executes the instructions in the machine-readable storage medium 102 as a user defined database function. The software application may call the operation in an encapsulated manner without details as to how the comparison is performed by the database.

The object template creation instructions 103 may include instructions to create a set of object template information based on at least one of image and video information. For example, the image and video information may be received from any suitable source. In one implementation, the input information is received via a network from multiple sources, such as from multiple surveillance cameras and/or from surveillance information from multiple entities. The object template creation may be performed in any suitable manner. For example, the object template may be created based on local binary patterns within an area of the image or video.

The object template storage instructions 104 include instructions to store the created object template information in the storage 109 as the object template information 110. For example, the processor 101 may perform a search operation or other operation with respect to the stored object template. Additional information may be stored as other fields related to the object template, such as information about the source of the content including the object template. In one implementation, the source image and/or video frame is also stored in the storage 109.

The target object template creation instructions 105 include instructions to create an object template associated with a target object. For example, the processor 101 may receive a set of input content, such as via a network. The input content may be a video and/or image. The processor 101 or a different processor may analyze the input content to determine an object of a particular type within the input content and to create an object template representative of the object. For example, an object recognition application may be executed related to the input content to identify areas likely associated with the target object type, such as a face. The object template may be any suitable object template, such as a feature vector.

The target object template storage instructions 106 include instructions to store the target object template in the storage 109. Information about the source content and the object may be stored in the storage 109. In one implementation, additional information related to the object may be associated with the object template information in the storage 109, such as geographic information associated with the source content. For example, location information or a person identifier may be associated with the object template, and the associated information may be linked such that the object template may be searched based on the additional information and/or the additional information may be output in response to a query related to the object template. As an example, a user may query object templates related to a particular input object template and located in a certain place at a certain time in a surveillance video.

The object identification instructions 107 may include instructions to identify an object associated with the target object based on a database comparison operation of the stored set of object template information to the stored target object template information. For example, the database compare operation may compare object template information stored in the storage 109. The processor 101 may perform the comparison in any suitable manner. The processor 101 may take advantage of parallel capabilities of the database system 100 such that different sets of object template information 110 may be simultaneously compared to the target object template also stored in the storage 109.

In one implementation, the process of comparing and creating the object template occurs together, such as where the target object is an object extracted and stored in the storage 109. For example, the processor 101 may store a new object template and then compare the new object template to stored object template. Information about the comparison results may be stored in the storage 109, such as where similar object templates are linked together.

The output instructions 108 may include instructions to output information related to the object identification. For example, the information may be transmitted, displayed, and/or output to the storage 109 or another storage. In one implementation, images and/or videos may be displayed based on similarity to a target object template, such as where information associated with the most similar object template, top N most similar object templates, or top X % of similar object templates is displayed. A user may view the source images and/or video related to the object templates and provide feedback as to whether the objects are likely to be the same. For example, a user may compare a target face to faces in the output top N images. In one implementation, the results of the database comparison operation are used by a software operation to provide data to a user via a user interface.

Figure 2:
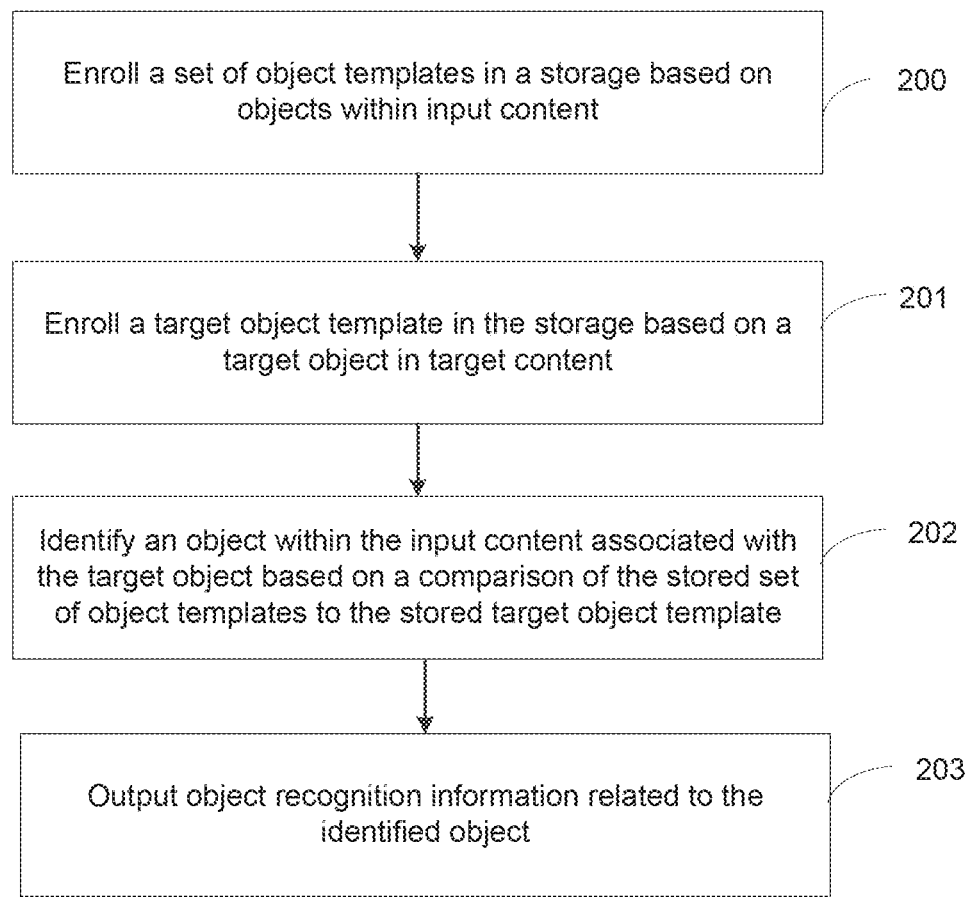
FIG. 2 is a flow chart illustrating one example of a method to perform a database comparison operation to identify an object.

FIG. 2 is a flow chart illustrating one example of a method to perform a database comparison operation to identify an object. Information may be stored related to object templates, and the object templates may be compared for object identification. For example, information may be associated with a first object template, and the first object template may be compared to additional stored object templates to determine if other object templates correspond to the first object template. The method may be performed by a database engine and/or analytics engine associated with a database engine, such as the processor 101 of FIG. 1.

Beginning at 200, a processor enrolls a set of object templates in a storage based on objects within input content. The input content may be any suitable input content, such as image or video content. Image and video content may be treated in a similar manner such that a stored object template associated with video content may be compared to an object template associated with image content. The input content may include video content such that an object template is associated with a set of adjacent video frames including the same object. For example, a single object template may be created for the object appearing in the adjacent frames.

The storage may be any suitable storage, such as a relational or XML database. The storage may be a database system including stored data and information related to stored user defined functions, such as functions that may be executed by the processor.

The processor may enroll the object templates in any suitable manner. Enrolling a set of object templates may include storing object templates received from another processor. In one implementation, the processor both analyzes input content to identify portions of the content to create an object template associated with it. The processor may ingest the input video and/or image data. The processor may then detect an object type within the ingested content, detect object landmark points, align the objects, and extract object features. The processor may create an object template based on the extracted object features. The object templates may be enrolled into the database system. The object templates may include any suitable information related to objects within the input content. For example, the object templates may include information about local binary patterns related to an area of the image or video. The information about the local binary patterns may be compared and classified.

Continuing to 201, a processor enrolls a target object template in the storage based on a target object in target content. The target content may be, for example, a video or image. Similarly to the input content, the object template may be created based on adjacent video frames including the same target object. The enrollment process may include creating the object template associated with the target object, and storing the object template in the storage such that it may later be compared. In one implementation, the processor ingests target content, identifies objects of a particular type within the content, creates object templates associated with the identified objects, and stores the created object templates. In one implementation, a software application performs image/video analysis and connects to the database to execute a user defined function related to creating an object template associated with the image/video analysis.

The target object may be a specific object in a user query and/or a set of objects within input content including multiple bounding boxes surrounding objects likely to be of a certain type is a target object. The target object may be automatically determined based on other triggering information, such as the actions of a user in a video.

The enrollment process may include linking the object template to additional information associated with the object. For example, time or location information may be associated with the input content and also associated with the object template. In one implementation, the enrollment process of the input object and/or target object includes associating the object template with data from additional sources related to the object template and/or input content. For example, the object template may be associated with an address associated with the surveillance information. In cases where an identity of an object template is known, name and other identifying information may be associated with the object template in the database.

Continuing to 202, a processor identifies an object within the input content associated with the target object based on a comparison of the stored set of object templates to the stored target object template. For example, a database comparison operation may be performed to compare information related to two object templates.

In one implementation, the processor both stores and compares an object template as a single step. For example, after enrolling an object template in the database, the processor may compare the object template to stored object templates. Information about links between the object templates may be stored. When the processor receives a query related to a target template, information about the linking object templates may be output.

The target object may be a user identified object related to a user query, or an object within selected content, such as where the processor iterates through each object identified within the selected content. In one implementation, the target object is automatically identified, such as where a processor ingests content from multiple surveillance videos and each identified object becomes a target object for search purposes after being stored. For example, an object may be enrolled and then compared, and then the next object may be enrolled and then compared.

In one implementation, the object identification is performed by multiple user defined database functions executing in parallel and/or a single user defined function taking advantage of parallel search capabilities of the database. For example, the target object template may be compared to a subset of stored data in parallel.

In one implementation, object identification includes both comparison to object templates and additional stored information. For example, a user may query for object templates related to an input object template and where the object template is associated with a particular location. A location field in the database may be searched and compared to the location criteria, and object templates fitting the location criteria may be compared to the target object template.

Continuing to 203, a processor outputs object recognition information related to the identified object. For example, the processor may output a top match, a top N ranked matches, a top % of matches to a query, and/or object templates with a similarity score above a threshold. The information may be output by transmitting, storing, or displaying the information. In one implementation, the output information is associated with a surveillance application for person identification. For example, a surveillance video including an incident of interest may be uploaded, and the output may include information related to object templates found in the uploaded video. In one implementation, the object template information is used for identification, and the output information includes information related to the object template, such as a name or address associated with the face template.

The information may be output to a software application calling the database comparison operation such that the software application processes and outputs information related to the received results of the database comparison operation.

Figure 3:
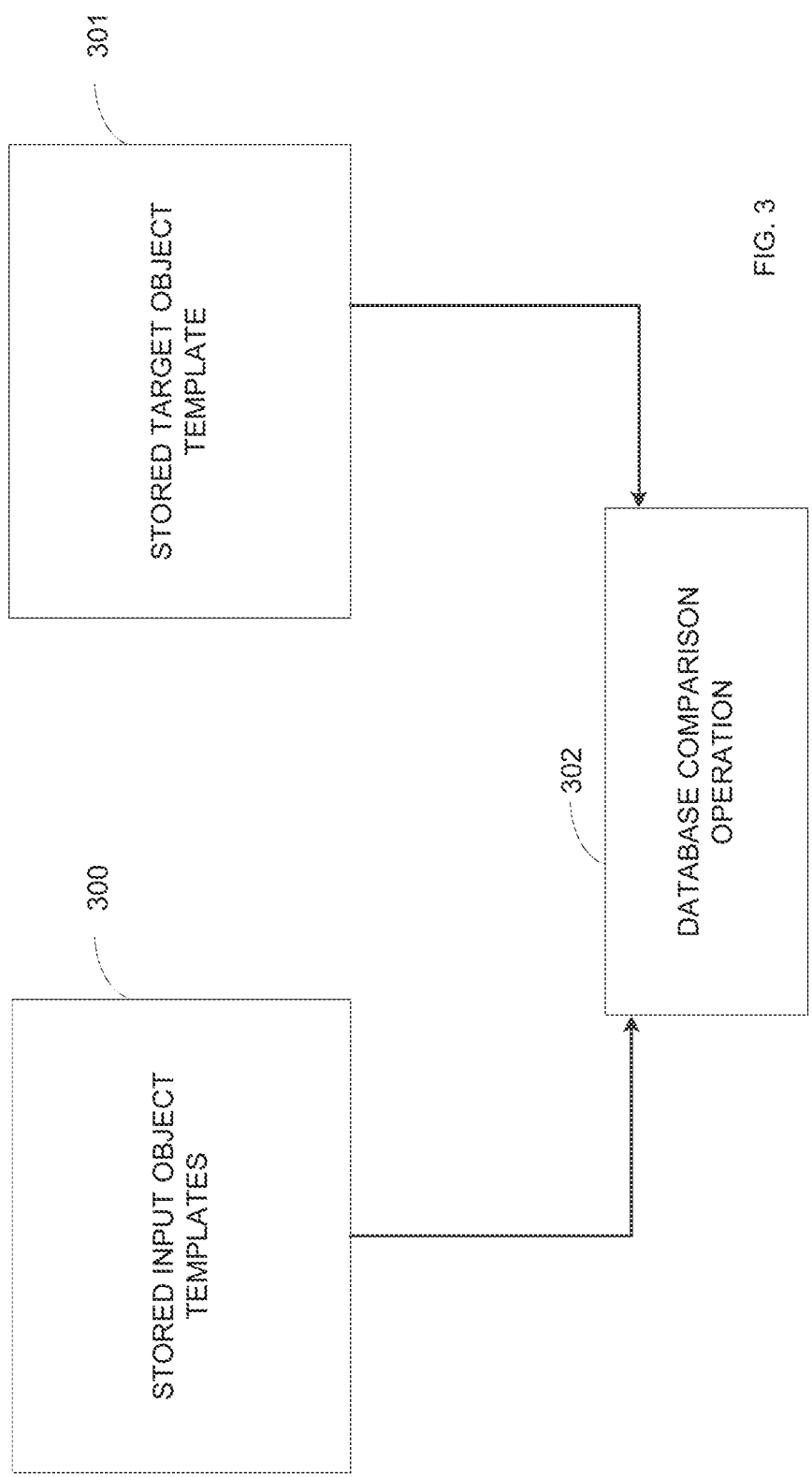
FIG. 3 is a diagram illustrating one example of a database comparison operation to perform object identification.

FIG. 3 is a diagram illustrating one example of a database comparison operation to perform object identification. For example, a database may include stored input object templates 300 and stored target object template 301. In one implementation, the target object template is a selected object template in the group of stored input object templates 300. A database comparison operation 302, such as a user defined function to compare stored data, may compare the stored input object templates 300 to the target object template 301. For example, a link may be established between correlating object templates and/or information may be output about a correlation, such as the top N closest object templates.

Figure 4:
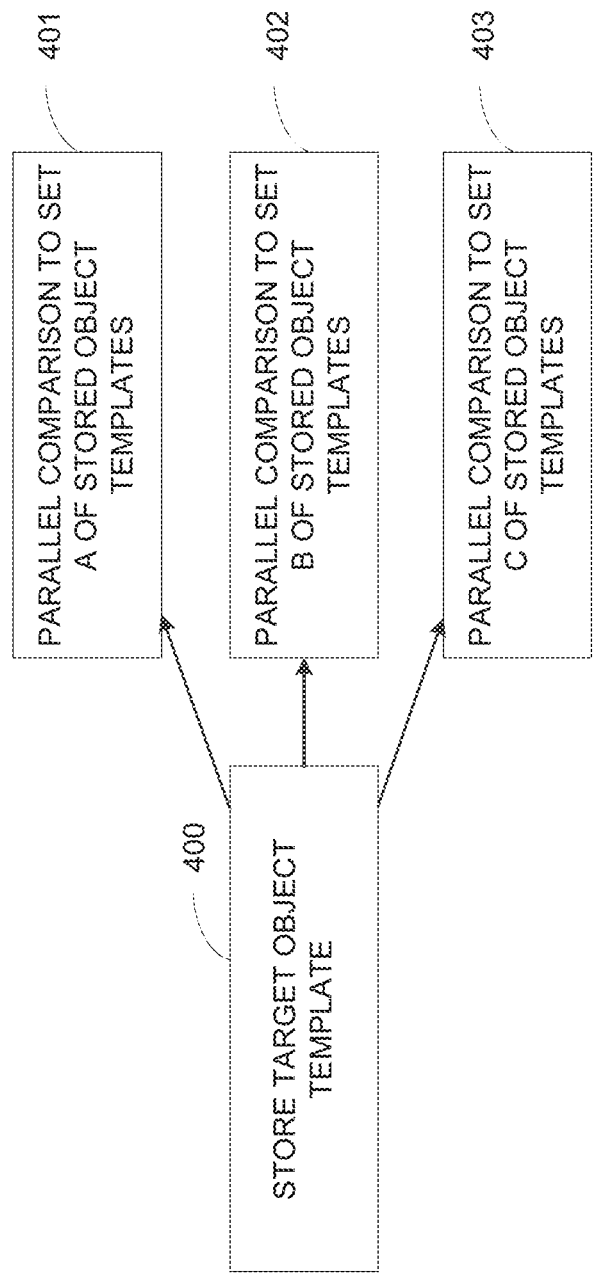
FIG. 4 is a diagram illustrating one example of performing a database comparison operation in parallel to identify an object.

FIG. 4 is a diagram illustrating one example of performing a database comparison operation in parallel to identify an object. For example, the stored target object template 400 may be simultaneously compared to a set of stored object template information, such as where a database comparison operation runs in parallel to compare the target object template 400 to different portions of stored data. As an example, a parallel comparison to set A 401, a parallel comparison to set B 402, and a parallel comparison to set C 403 may occur automatically using the database parallel search capabilities. In one implementation, multiple user defined functions are executed to search different portions of the stored data.

FIG. 5 is a flow chart illustrating one example of performing a database comparison operation to identify an object in conjunction with storing object information. For example, a database storage and comparison operation may be performed in conjunction with one another such that an enrollment process of an object into a database includes a comparison step to other stored data. The database may store information related to links between the object and other information. The linking information may be associated with similarities between the object templates or other information, such as a link between people of the same family. When the database is queried, the information about the links may be part of the search criteria and/or the query output may include information about the linked object templates.

Beginning at 500, a processor creates an object template for the next object. For example, the processor may move to the next bounding box identified as a potential object in an image or video or move to the next image or video frame. Continuing to 501, the processor stores the object template. The processor may store the object template in a database. Continuing to 502, the processor compares the newly stored object template to a set of previously stored object templates. For example, a database user defined function may compare the newly stored object template to previously stored object templates. Information about the comparison results may be output to a user and/or added to the storage to be associated with the newly stored object template. The processor may continue to the next object template.

Performing object identification using a database comparison operation may take advantage of the database comparison capabilities and allow for simpler object identification software application to rely on database operations.

The invention claimed is:

1. A database system, comprising:
    a hardware processor, a memory, and a database,
    wherein the memory stores instructions that when executed cause the hardware processor to:
        create sets of first object template information based on at least one of image information and video information;
        store the sets of first object template information in the database;
        create target object template information associated with a target object in at least one of an input image and an input video;
        store the target object template information in the database;
        respond to a query corresponding to a database comparison operation to identify a second object associated with the target object, wherein the database comparison operation corresponds to parallel search capabilities of the database to cause the hardware processor to simultaneously compare the sets of first object template information to the target object template information to identify the second object, and wherein the sets of first object template information comprise a first set of first object template information containing data representing features of a first person and a second set of first object template information containing data representing features of a second person other than the first person; and
        output object recognition information related to the second object.

2. The database system of claim 1, wherein the sets of first object template information comprise at least one of a file name, tracker number, video frame number, object bounding box coordinates, face bounding box coordinates, and object feature template information.

3. The database system of claim 1, wherein the database stores information linking a given set of first object template information of the sets of first object template information to additional information related to the second object.

4. The database system of claim 3, wherein the additional information is related to information associated with the at least one of the image information and the video information.

5. The database system of claim 1, wherein the database comprises a relational database.

6. The database system of claim 1, wherein the hardware processor executes multiple user defined database functions in parallel to perform the simultaneous comparison.

7. The database system of claim 1, wherein the hardware processor executes a user defined database function corresponding to multiple parallel searches to perform the simultaneous comparison.

8. A method, comprising:
    storing a set of first object templates in a database based on a plurality of objects within an input content, wherein the set of first object templates comprises a first object template containing data representing features of a first person and a second object template containing data representing features of a second person different from the first person;
    storing a target object template in the database based on a target object in a target content;
    responding to a query corresponding to a database comparison operation to identify a second object associated with the target object, wherein the database comparison operation corresponds to parallel search capabilities of the database to simultaneously compare the set of first object templates to the target object template to identify the second object in the input content; and
    outputting object recognition information related to the second object in the input content.

9. The method of claim 8, further comprising comparing a subset of first object templates of the set of first object templates to other object templates during an enrollment process.

10. The method of claim 8, wherein the input content includes a video content and wherein a first object template of the set of first object templates is associated with a set of adjacent video frames including an object appearing in all video frames of the set of adjacent video frames.

11. The method of claim 8, wherein the simultaneous comparison comprises executing multiple user defined database functions in parallel.

12. The method of claim 8, wherein the simultaneous comparison comprises executing a user defined database function associated with parallel database searching.

13. A machine-readable non-transitory storage medium storing instructions that, when executed by a processor, cause the processor to:
    store a set of first object templates in a database based on a plurality of objects within an input content;
    storing a target object template in the database based on a target object in a target content;
    respond to a query corresponding to a database comparison operation to identify a second object associated with the target object, wherein the database comparison operation corresponds to parallel search capabilities of the database to cause the database to simultaneously compare the set of first object templates to the target object template to identify the second object in the input content, wherein the set of first object templates comprise a first stored object template containing data representing features of a first person and a second stored object template containing data representing features of a second person other than the first person; and
    output information related to the second object based on a result of the query.

14. The machine-readable non-transitory storage medium of claim 13, wherein the set of first object templates comprises stored feature information related to both images and videos.

15. The machine-readable non-transitory storage medium of claim 13, wherein the output information is associated with a surveillance application for person identification.

16. The machine-readable non-transitory storage medium of claim 13, wherein the database comprises a relational database.

17. The machine-readable non-transitory storage medium of claim 13, wherein the query invokes a user defined function to cause the database to perform parallel searching.

18. The machine-readable non-transitory storage medium of claim 13, wherein the query invokes a parallel execution by the database of multiple user defined functions to cause the database to perform the simultaneous comparison.

* * * * *